United States Patent Office 3,257,737
Patented June 28, 1966

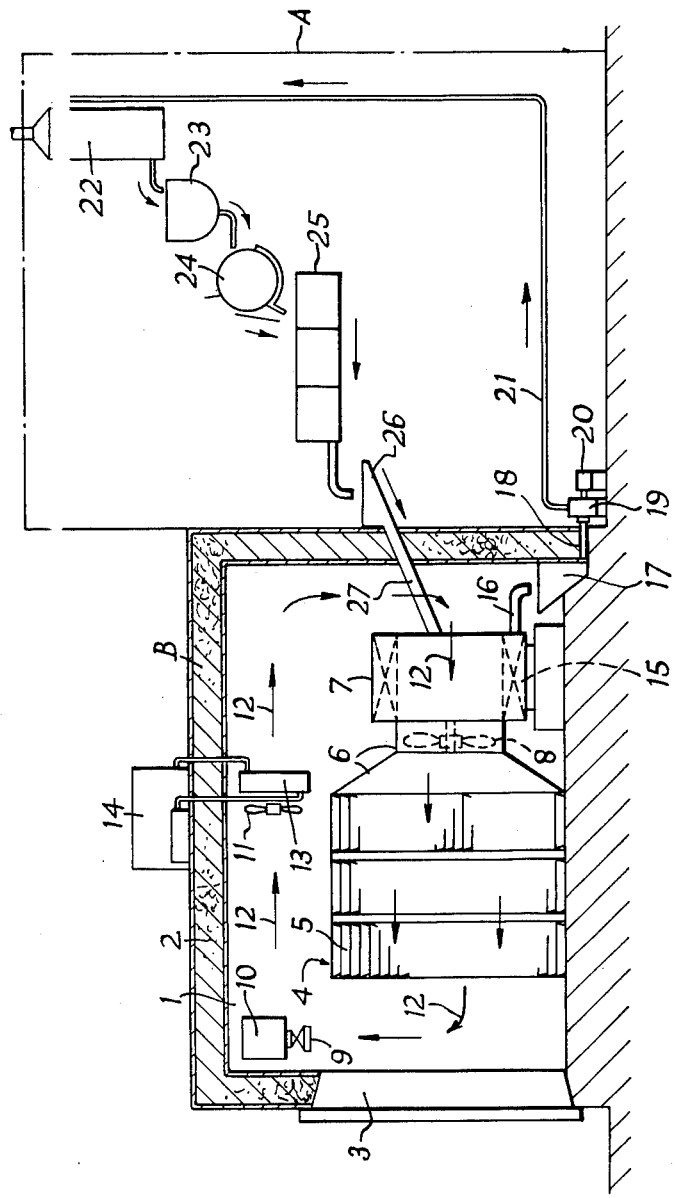

3,257,737
PROCESS AND APPARATUS FOR LOW-TEMPERATURE DEHYDRATION
Thomas Margittai, Rue Conselheiro Crispiniano 344–10, Conj. 1004, Sao Paulo, Brazil
Filed May 21, 1962, Ser. No. 202,344
Claims priority, application Great Britain, Oct. 11, 1961, 36,466/61
11 Claims. (Cl. 34—27)

This invention relates to a process and apparatus for low temperature dehydration of materials having a physically-removable water content, and particularly foodstuffs such as cereals, vegetables, fruit extracts, fish and meat.

For the reason that the rate of escape of moisture from such a material depends, inter alia, on the vapour pressure of the moisture substantially all commercial processes of dehydration in use today utilise either (1) increase of temperature, or (2) lowering of external pressure, to permit lowering the dehydration temperature.

A first object of the present invention is to provide a process wherein, in contradistinction, the temperature is kept, if anything, lower than room temperature, and wherein the pressure of a gaseous medium used in the process is substantially immaterial and may approximate to atmospheric.

A second object is to provide a novel apparatus for use in carrying out the above process.

According to the present invention, a process for the dehydration of a moisture-containing material comprises, in combination, the steps of bringing the material to within the range of −10° C. and +15° C. inclusive, continuously recirculating over said material a gas or gas mixture inert to the material, and continuously extracting from said gas or gas mixture moisture taken up by it from the material to be dehydrated.

The word dehydration is intended herein to cover removal of all, or only part, of the moisture content of a material.

The temperature range is intended to have its lower limit at a temperature which is below 0° C. but not to an extent to necessitate expensive machinery, and its upper limit a temperature somewhat above 0° C. but not such as to risk deterioration of the material, e.g. by fermentation, mould growths etc. A preferred range would be, say, −5° C. to +10° C.

The pressure of the gaseous current may be approximately atmospheric, but within wide limits the pressure or vacuum will not affect operation of the process and it will normally be found most convenient to operate plant at or below the atmospheric pressure, preferably slightly below.

The speed at which the gaseous current passes over the material may again vary within wide limits, but preferably such speed is approximately the maximum useful speed, i.e. at which the quantity of gas passing into adequate contact with the material is just sufficient to remove the vapour from the material. A range of gas current speeds which has been found useful in practice for drying of light or finely-divided vegetable matter is three to ten feet per second, but each product in practice has an optimum speed which can readily be found empirically.

The moisture content of the gas current is removed in any convenient manner to permit the gas (or mixture of gases) to be recirculated. In a preferred method, the gaseous current is passed over a hygroscopic material. For a truly continuous process, the hygroscopic material may itself take part in a secondary cycle in which it is relieved of the moisture to enable it to be used again in relation to the gaseous current. In a preferred practical embodiment, the gaseous current is passed into contact with an initially-solid hygroscopic material. When moisture extraction from the gaseous current has resulted in absorption of a predetermined amount of moisture by the hygroscopic material, the latter is dissolved and runs to a heating plant where its moisture is removed to turn back into the solid phase. This dried material is then recycled to meet the gas. Thus a first cycle consists of take-up and delivery of moisture by the gaseous current to the hygroscopic material, and a second cycle consists of the regeneration of the hygroscopic material, both cycles working continuously.

An alternative step for removal of the moisture content from the gaseous current would be cooling thereof to cause the condensation of the moisture content.

Any suitable gas may be used to contact the material to be dried. Nitrogen is inert in relation to foodstuffs in general, and has the virtue of being cheap and non-corrosive.

In a preferred process step, of particular advantage commercially, a supply of nitrogen for use in the necessary plant is obtained by initially filling a chamber with air. Then a predetermined quantity of a suitable fuel is burned in the air to eliminate the oxygen. Preferably the fuel is chosen so as to leave no undesirable residues in the system, e.g. alcohol when burnt will leave only a small quatity of water and of carbon-dioxide. The water is subsequently removed by the general operation of the process. So that the whole may be carried on within the plant without inconvenience from heat effects, the alcohol may be burnt in a heat-exchanger so that no rise in temperature is experienced in the system of the main dehydration plant.

Where the process is concerned with the dehydration of foodstuffs the retention of the temperature at or near freezing point, apart from being much less costly than the conventional low temperature method, has the advantage that the material remains preserved by chilling, for the duration of the process which is generally (but not necessarily) 24 hours.

The process is applicable to a very wide field of moisture-containing foodstuffs, but it has been found practicable in relation to fruit extracts such as juices of

| orange | pineapple |
| lemon | apricot |
| grape | passion-fruit | and to whole or comminuted vegetables, raw or pre-cut or cooked as the case may be, such as

| carrots | sweet potato |
| peas | common potato |
| cauliflower | spinach, etc. |
| onions | | and also:

| fish | lobster |
| shrimps | meat-poultry, etc. |

Such a process has many advantages over low temperature/high vacuum processes as used commonly today:

(i) There is limitation of temperature to the range which may well be the normal storage temperature range required in any case for the material.

(ii) No vacuum apparatus is necessary, and operation at or only slightly below atmospheric pressure permits particularly simple construction of the plant.

(iii) The speed of the inert gas is relatively low and requires little power consumption.

(iv) Where nitrogen is used as the inert gas, it is a cheap raw material.

(v) The second cycle of regenerating the hygroscopic material is straight-forward and incapable of deleteriously affecting the material to be dehydrated.

An apparatus suitable for use in carrying out the process comprises means for continuously recirculating over the material a gas or gas mixture, means for bringing the material within the range of −10° C. and +15° C., and means for continuously extracting from said gas or gas mixture moisture taken up by it from the material to be dehydrated. In a preferred form, the gas or gas mixture is itself brought to within the range of −10° C. and +15° C., thereby serving also to cool the material to be dehydrated.

Advantageously, means for continuously extracting moisture from the gas or gas mixture comprises a plant in which hygroscopic material is continuously recirculated through a stage of exposure to the wet gas or gas mixture, and through a stage of regeneration by heating to drive off the moisture taken up. In an alternative, the gas or gas mixture may be subjected to cooling in a plant adapted for continuously extracting moisture therefrom.

Where the gas mixture to be recirculated consists of atmospheric air with its oxygen content removed, the apparatus may conveniently comprise a burner for alcohol or other suitable fuel having non-injurious combustion products, and an associated heat-exchanger for removal of any heat of combustion.

In a preferred practical embodiment, such apparatus comprises a first heat-insulated chamber containing means for circulating a gas or gas mixture, means for supporting material therein so as to be exposed to the gas or gas mixture, and means for passing the gas or gas mixture over a hygroscopic material, and a second chamber containing means for the continuous regeneration of the hygroscopic material used in the first chamber.

In order that the nature of the invention may be readily ascertained, an embodiment of apparatus and its method of operation in accordance with this invention are hereinafter particularly described with reference to the accompanying drawing.

This drawing is a schematic central vertical section through a complete dehydration plant suitable for dealing with the products listed above.

The apparatus comprises a first chamber "A" which need not be heat-insulated, and a second chamber "B" which is provided with a heat-insulating wall 1, roof 2, and door 3 of any conventional construction, as well known for example in bulk refrigerating plants.

In chamber "B" is provided a frame 4 to receive a series of stacks of trays 5 in which is placed the material to be dehydrated. At one end of the frame 4 is provided a trunking 6 leading from another frame 7, a fan 8 being arranged in the trunking to draw gas through frame 7 and out through frame 4. Frame 7 comprises means for the distribution of hygroscopic material so as to expose said material to the maximum extent to the gas which is circulating through the frame. By way of example, such frame could include inclined perforated trays on which the hygroscopic material is placed and along which the material will progress from a higher level by a reciprocating movement of the perforated trays.

In the chamber is arranged a burner 9 for the burning of alcohol, the heat of combustion being taken away by means of a heat-exchanger 10 arranged immediately above the burner. Assuming that the chamber "B" is initially filled with atmospheric air, a readily predeterminable quantity of alcohol burnt in the burner 9 will remove the oxygen and leave a mixture of gases which is largely nitrogen, plus carbon-dioxide resulting from the combustion, plus smaller quantities of the usual other constituent gases of atmospheric air, plus a little moisture resulting from the combustion.

This mixture is circulated, both by the fan 8 and by another fan 11, in the direction shown by the arrows 12 and thus passes firstly over the hygroscopic material and thereafter over the material to be dehydrated. In circulating round chamber "B," the mixture of gases is also passed through a heat-exchanger 13 of a refrigerating unit 14, thereby cooling the gases.

The hygroscopic material in the frame 7 picks up moisture from the circulating gases, and eventually becomes liquefied. It then passes downwardly to a collector receptacle 15 at the base of the frame 7, and flows out through a pipe 16 into a trough 17. From the latter it flows through a pipe 18 into the intake of a liquid pump 19 driven by a motor 20. The liquid is pumped through a conduit 21 to a pre-heater and evaporator 22. It then flows, under the control of a suitable valve (not shown) into a concentrator 23 from which it can flow at a suitably slow rate onto the periphery of a heated drum crystallisator-cooler 24 which serves to drive off the moisture content. Any suitable means (not shown) are provided to circulate atmospheric air through chamber "A" for the purpose of removing the moisture driven off by the drum 24. The dried hygroscopic material then passes into a collecting tray 25 from which it can flow, from time to time as required, into a funnel 26 leading through a conduit 27 to the upper part of the frame 7. Once the nitrogenous gas mixture has been produced, there are two cycles occurring continuously: in chamber "B" the gas mixture is passing and re-passing through the hygroscopic material and through the material to be dehydrated, until the latter has been brought to a suitable low moisture content. At the same time, in chamber "B" and in the frame 7, the hygroscopic material is continually being exposed to moisture-laden gas in the frame 7, and thereafter being regenerated by passing through the drum drier 24. The pressures throughout both chambers remain at atmospheric. The temperature in chamber "B" is determined by the operation of the refrigerating machinery 14. In chamber "A" the temperature is unimportant, but in practice might be a little above atmospheric, due to the presence of the drying drum 24.

I claim:
1. A process for the dehydration of moisture-containing material in a chamber comprising the steps of:
 (a) Bringing said material to a predetermined temperature not exceeding about 15° C.;
 (b) Passing a gas at substantially atmospheric pressure and at substantially said predetermined temperature past said material to extract moisture therefrom;
 (c) Passing said moisture-containing gas past a moisture-extracting material in said chamber to transfer moisture from said moisture-containing gas to said moisture-extracting material for substantially reducing the moisture content of said gas;
 (d) Recycling said reduced moisture-containing gas at substantially atmospheric pressure past said moisture-containing material and said moisture-extracting material; and
 (e) Constantly removing moisture from said moisture-extracting material while said gas is repassing past said moisture-containing material and said moisture-extracting material.

2. A process as in claim 1 wherein said predetermined temperature is in the range of about −10° C. to about +15° C. and the only source of heat applied to said moisture containing material is via said gas at substantially said predetermined temperature.

3. A process as in claim 1 wherein the material to be dehydrated is brought to a temperature lower than the ambient temperature through cooling by the recirculated gas.

4. A process as in claim 1 wherein said predetermined temperature is below 0° C.

5. A process as in claim 1 wherein said gas is passed over said moisture-containing material and said moisture-extracting material at a rate of flow of between three and ten feet per second.

6. A process as in claim 1 wherein said gas is substantially nitrogen.

7. Apparatus for dehydration of moisture-containing material comprising means for bringing said material to a predetermined temperature not exceeding about 15° C., means for enclosing said material at substantially atmospheric pressure, means for passing a gas at substantially said predetermined temperature and at substantially atmospheric pressure past said material to extract moisture therefrom, means within said enclosing means for interposing moisture-extracting material in the path of said gas for extracting moisture from said gas and substantially reducing the moisture content of said gas, means for recycling the reduced moisture-containing gas at substantially atmospheric pressure past said moisture-containing material and said moisture-extracting material, and means for constantly removing moisture from said moisture-extracting material while said gas is repassing past said moisture-containing material and said moisture-extracting material.

8. Apparatus as in claim 7 wherein said gas is passed over said moisture-containing material at a rate of flow of from about three to about ten feet per second.

9. Dehydrated materials made in accordance with the process of claim 1.

10. Apparatus as in claim 8 wherein said predetermined temperature does not exceed 0° C.

11. Apparatus for dehydration of moisture-containing material comprising means for bringing said material to a predetermined temperature within the range of about −10° C. to about +15° C., means for enclosing said material at substantially atmospheric pressure, means for passing a gas at substantially said predetermined temperature and at substantially atmospheric pressure past said material to extract moisture therefrom, means within said enclosing means for interposing moisture-extracting material in the path of said gas for extracting moisture from said gas and substantially reducing the moisture content of said gas, means for recycling the reduced moisture-containing gas at substantially atmospheric pressure past said moisture-containing material and said moisture-extracting material, and means for constantly removing moisture from said moisture-extracting material while said gas is repassing past said moisture-containing material and said moisture-extracting material, said apparatus having no source of heat other than from said gas at substantially said predetermined temperature which heat is transferred to said moisture containing material to help extract moisture therefrom.

References Cited by the Examiner

UNITED STATES PATENTS

| 2,249,624 | 7/1941 | Bichowsky | 34—27 |
| 2,422,536 | 6/1947 | Finnegan | 34—77 |
| 2,435,503 | 2/1948 | Levinson | 34—15 |
| 2,480,954 | 9/1949 | Palmer | 34—5 |

ALDEN D. STEWART, *Primary Examiner.*

NORMAN YUDKOFF, WILLIAM F. O'DEA,
*Examiners.*

W. C. EVERETT, A. D. HERMANN,
*Assistant Examiners.*